United States Patent
Gohite et al.

(10) Patent No.: US 9,800,432 B2
(45) Date of Patent: *Oct. 24, 2017

(54) USING ETHERNET RING PROTECTION SWITCHING WITH COMPUTER NETWORKS

(71) Applicant: Cisco Technology, Inc., San Jose, CA (US)

(72) Inventors: Pravin Gohite, Boxborough, MA (US); Samer Salam, Vancouver (CA)

(73) Assignee: Cisco Technology, Inc., San Jose, CA (US)

(*) Notice: Subject to any disclaimer, the term of this patent is extended or adjusted under 35 U.S.C. 154(b) by 185 days.

This patent is subject to a terminal disclaimer.

(21) Appl. No.: 14/740,417

(22) Filed: Jun. 16, 2015

(65) Prior Publication Data

US 2015/0288535 A1    Oct. 8, 2015

Related U.S. Application Data

(63) Continuation of application No. 13/752,925, filed on Jan. 29, 2013, now Pat. No. 9,088,438.

(51) Int. Cl.
*H04L 12/46* (2006.01)
*H04L 12/437* (2006.01)
*H04L 12/24* (2006.01)
*H04L 12/703* (2013.01)
*H04L 12/721* (2013.01)

(52) U.S. Cl.
CPC ........ *H04L 12/437* (2013.01); *H04L 12/4641* (2013.01); *H04L 41/0654* (2013.01); *H04L 45/28* (2013.01); *H04L 45/66* (2013.01)

(58) Field of Classification Search
None
See application file for complete search history.

(56) References Cited

U.S. PATENT DOCUMENTS

| | | | |
|---|---|---|---|
| 7,643,409 B2 | 1/2010 | Voit et al. | |
| 7,903,676 B2 | 3/2011 | Sajassi et al. | |
| 8,040,795 B2 | 10/2011 | Mirtorabi et al. | |
| 2003/0154285 A1 | 8/2003 | Berglund et al. | |

(Continued)

OTHER PUBLICATIONS

"Notification of Transmittal of the International Search Report and the Written Opinion of the International Searching Authority, or the Declaration", Patent Cooperation Treaty, International Application No. PCT/US2014/013583, dated Mar. 24, 2014, 7 pages, European Patent Office, Rijswijk, Netherlands.

*Primary Examiner* — Charles C. Jiang
*Assistant Examiner* — George Atkins, Jr.
(74) *Attorney, Agent, or Firm* — Parker Ibrahim & Berg LLC; James M. Behmke; Stephen D. LeBarron

(57) ABSTRACT

In one embodiment, a first routing device establishes a virtual channel with a remote routing device in a G.8032 protocol Ethernet network ring. The first routing device and the remote routing device each being linked to a multi-homed routing device having Layer 2 connectivity to a core network. The multi-homed routing device is not configured with the G.8032 protocol. The first routing device identifies a link state from the first routing device to the multi-homed routing device. Layer 2 connectivity of the first routing device to the core network is controlled based upon the identified link state of the first routing device.

20 Claims, 5 Drawing Sheets

(56) References Cited

U.S. PATENT DOCUMENTS

| | | |
|---|---|---|
| 2006/0274768 A1 | 12/2006 | Suzuki et al. |
| 2008/0089326 A1 | 4/2008 | Kotria et al. |
| 2008/0285466 A1 | 11/2008 | Salam et al. |
| 2010/0315946 A1 | 12/2010 | Salam et al. |
| 2011/0032945 A1 | 2/2011 | Mullooly et al. |
| 2011/0075554 A1* | 3/2011 | Holness .................. H04L 1/22 370/228 |
| 2011/0222396 A1* | 9/2011 | Tochio ................ H04L 12/437 370/222 |
| 2012/0106360 A1* | 5/2012 | Sajassi ................ H04L 12/437 370/245 |
| 2012/0155484 A1* | 6/2012 | Sergeev ............... H04L 12/437 370/405 |
| 2012/0219004 A1* | 8/2012 | Balus ................ H04L 12/4641 370/395.53 |
| 2013/0094357 A1 | 4/2013 | Sankar et al. |
| 2013/0100851 A1 | 4/2013 | Bacthu et al. |
| 2014/0293774 A1* | 10/2014 | Behrens ............... H04L 12/437 370/225 |

* cited by examiner

USING ETHERNET RING PROTECTION SWITCHING WITH COMPUTER NETWORKS

CROSS-REFERENCE TO RELATED APPLICATIONS

This application is a Continuation application of U.S. patent application Ser. No. 13/752,925, filed Jan. 29, 2013, the entire content of which is herein incorporated by reference.

TECHNICAL FIELD

The present disclosure relates generally to computer networks, and, more particularly, to using Ethernet ring protection switching with computer networks.

BACKGROUND

In access link and node redundancy for service provider based Layer 2 Virtual Private Network (L2VPN) services, customers typically desire resilient site multi-homing access capabilities that are similar to Layer 3 VPN services. However, redundancy in the L2VPN topologies is much more complex compared to Layer 3 VPN topologies because of potential Ethernet frame looping conditions.

One solution to avoid looping conditions is to apply a spanning tree protocol. However, the spanning tree protocol has problems with scalability, and can also result in looping conditions if the spanning tree protocol is misconfigured. Additionally, the spanning tree protocol is typically run over the top of a service provider's network and thus the service provider has no control or visibility that the solution is enabled and working properly.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

According to one or more embodiments, a first routing device establishes a virtual channel with a remote routing device in a G.8032 protocol Ethernet network ring. The first routing device and the remote routing device each being linked to a multi-homed routing device having Layer 2 connectivity to a core network. The multi-homed routing device is not configured with the G.8032 protocol. The first routing device identifies a link state from the first routing device to the multi-homed routing device. Layer 2 connectivity of the first routing device to the core network is controlled based upon the identified link state of the first routing device.

Description

Figure 1:
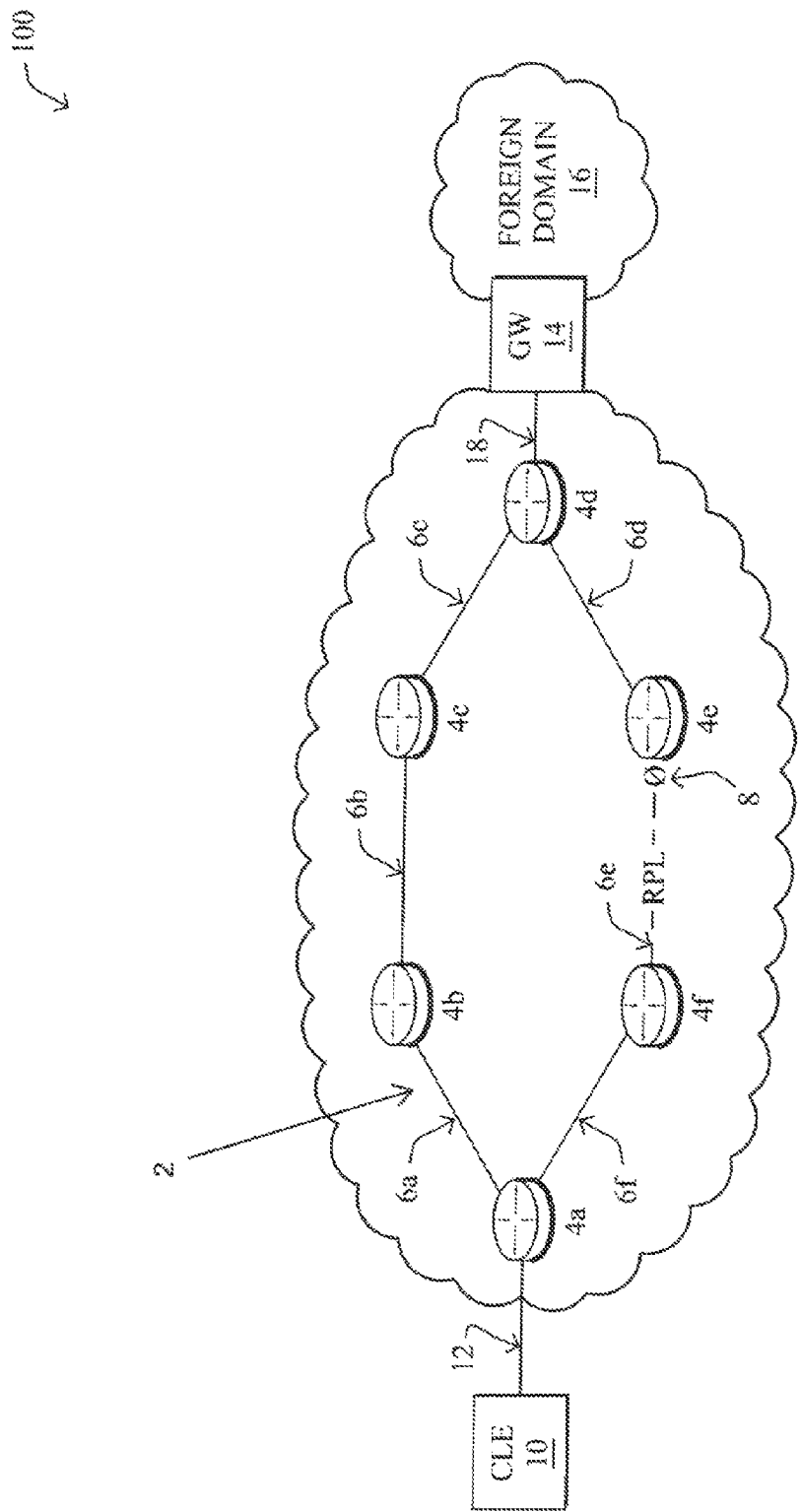
FIG. 1 depicts a block diagram schematically illustrating an Ethernet ring based on ITU-T recommendation G.8032.

ITU-T SG15/Q9 recommendation G.8032 (February 2008) describes protection switching in an Ethernet ring. Referring to FIG. 1, an Ethernet ring 2 is an Ethernet network 100 comprising nodes 4 and links 6 connected together in a closed loop topology. One of the links 6 of the ring is typically designated as a Ring Protection Link (RPL), and is disabled during normal operation of the ring by placing a channel block on that link. Typically, a channel block 8 is imposed at a node at one end of the RPL, which node may then be referred to as the RPL Owner. The channel block 8 may, for example, comprise a policy that prevents packets of the ring from being forwarded through a port hosting the RPL. With such a channel block in place, the ring 2 is guaranteed to be loop free, and conventional Ethernet MAC-learning and path computation can be used to compute and install appropriate forwarding information in each node of the ring.

As described in ITU-T recommendation G.8032, a failure of either a link 6 or a node 4 of the ring 2 will be detected by the two nodes 4 nearest the point of failure. Both of these nodes will send a signal fail message (FIM) to their nearest neighbor nodes in the ring, and these FIMs will be propagated, in opposite directions, around the ring. Upon receipt of a FIM, each node flushes its forwarding database (FDB), and forwards the FIM to the next node on the ring. In addition, the RPL-Owner will remove the channel block 8. This effectively enables connectivity within the ring to be re-established using conventional Ethernet flooding and MAC learning functionality.

An advantage of ITU-7 recommendation G.8032 is that it utilizes conventional Ethernet path labeling and packet forwarding techniques to implement a ring network. However, ITU-T recommendation G.8032 contemplates an arrangement in which the ring network is defined entirely within a given Ethernet network domain.

As may be seen in FIG. 1, customer located equipment (CLE) 10, such as a customer premised Local Area Network or router, for example, can connect to the Ethernet ring 2 via an access connection 12. In a directly analogous manner, the Ethernet ring 2 can connect to a network edge node such as a gateway (GW) 14 to a foreign network domain 16 through a hand-off connection 18. In the following description, a method for implementing the access connection 12 between the CLE 10 and the Ethernet ring 2 are discussed with reference to the illustrated embodiment of FIG. 2.

Figure 2:
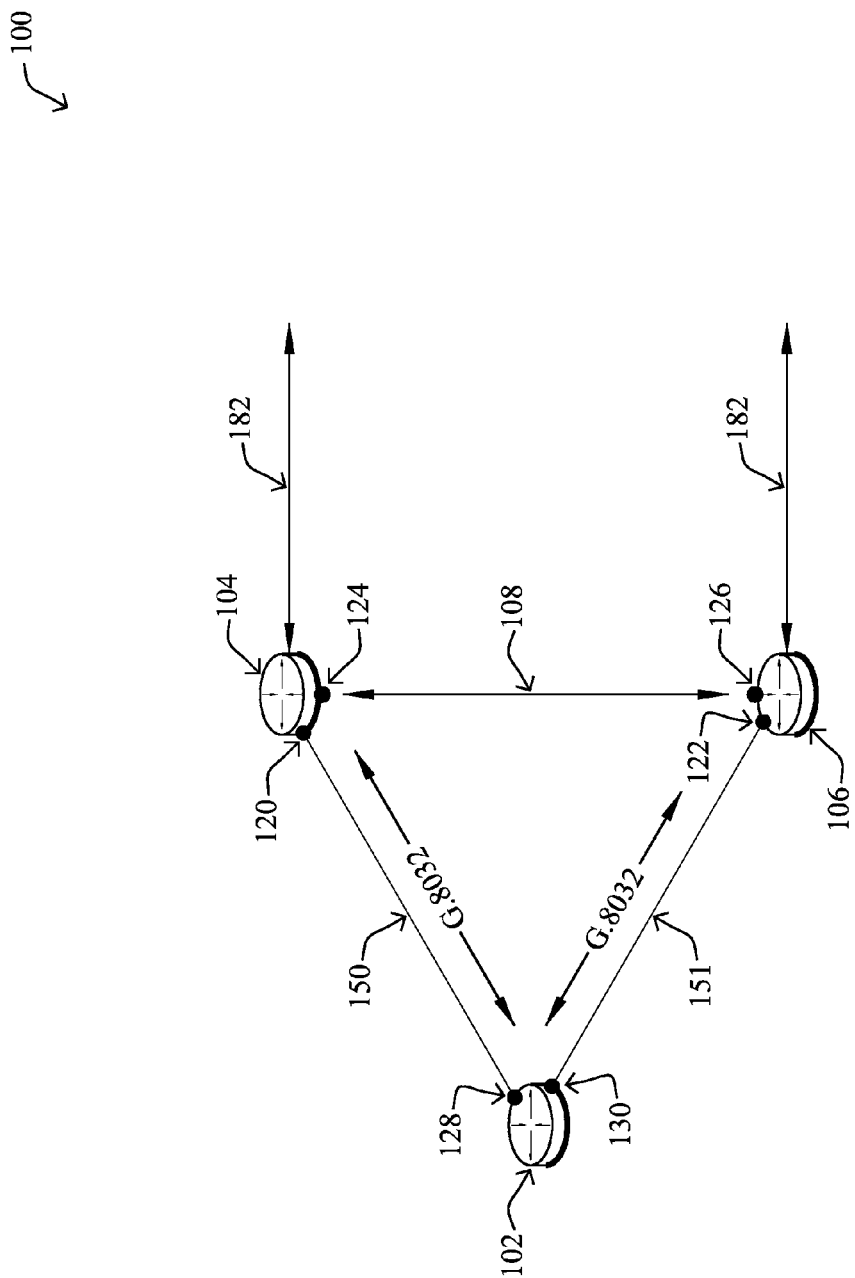
FIG. 2 depicts a block diagram schematically illustrating a technique for connecting a node to an Ethernet ring in accordance with an illustrative embodiment.

With reference to the illustrated embodiment of FIG. 2, it is to be appreciated and understood service providers deploying L2VPN services typically require dual-homing solutions that offer provider edge (PE) node redundancy with synchronous optical network (SONET) like convergence characteristics. For instance, this is especially relevant in Carrier Ethernet Exchange applications (e.g., CENX). Such a solution should at least meet the requirements: 1) guarantees 50 ms convergence time for access failure; 2)

handles link, port, PE node failures and PE node isolation from an MPLS core; 3) supports Ethernet LINE (E-LINE), Ethernet LAN (E-LAN) and Ethernet Tree (E-TREE) services; 4) supports active/standby (1:1) us well as active/active (1+1) redundancy modes; 5) requires minimal resiliency control protocol support on a multi-homed device (CE) (e.g., no MST or G.8032 support on CE; and 5) supports co-located and geo-redundant PE's.

It is to be also understood and appreciated ITU-T G.8032 is a standards based Ethernet ring protection switching r-commendation to provide sub-50 ms protection and recovery switching for Ethernet traffic in a ring topology while at the same time ensuring that there are no loops formed at the Ethernet layer. In the illustrated embodiment of FIG. 2, and as described below, a redundancy solution for device multi-homing using G.8032 is provided having the desired aforesaid active/standby (1:1) and active/active (1+1) PE redundancy.

FIG. 2 depicts a diagram of an example of a computer network system 100, in accordance with an illustrative embodiment, utilizing Ethernet Ring Protection Switching. The network system 100 includes a dual-homed routing device (DHD) 102, which is a type of a multi-homed routing device, linked with routing devices 104 and 106. It should be appreciated that multi-homing is a network topology in which a network device is connected to the network by way of two or more independent access points (or points of attachment). Therefore, a dual-homed device, such as dual-homed routing device 102, is a network device (e.g., customer located equipment 10) connected to a network by way of two independent access points. A triple-homed device for instance is a network device connected to a network by way of three independent access points.

Provided are communication links 150 and 151, from the dual-homed routing device 102, to the routing devices 104 and 106 (e.g., provider edge or "PE" devices). The PE devices 104 and 106 are physically separate elements providing redundant access to routing device 102, along with physical separate attachment circuits, which are connected to the communication links 150 and 151, terminating on the routing devices 104 and 106, respectively.

The routing devices 104 and 106 are in communication with each other by way of a virtual channel 108 and are grouped as a single redundancy group, which refers to groupings of network devices (e.g., routing devices 104 and 106) for providing access protection to multi-homed devices. As used herein, a virtual channel refers to a control channel 108 for communication between routing devices within a redundancy group (e.g., routing devices 104 and 106) and as preferably defined in the G.8032 standard. It is also to be understood the link states for links 150 or 151 may also be referred to as an "attachment circuit state," and such terms may be used interchangeably. Generally, an "attachment circuit," is a physical or virtual circuit attaching, for example, a multi-homed routing device 102 to a remote routing device 104 or 106. An attachment circuit can be, for example, an Ethernet port or a Virtual Local Area Network (VLAN) on the Ethernet port. It should also be noted that the forwarding status of one or more pseudowires 182 (PW) (e.g., active or standby) is derived from the state of the associated attachment circuit. A "pseudowire" (e.g., one of many pseudowires 182) is an emulation of a service over a packet-switching network (e.g., MPLS or Internet Protocol). The emulated service may be ATM, Frame Relay, Ethernet, low-rate Time-division multiplexing (TDM), or Synchronous optical networking (SONET).

Figure 3:
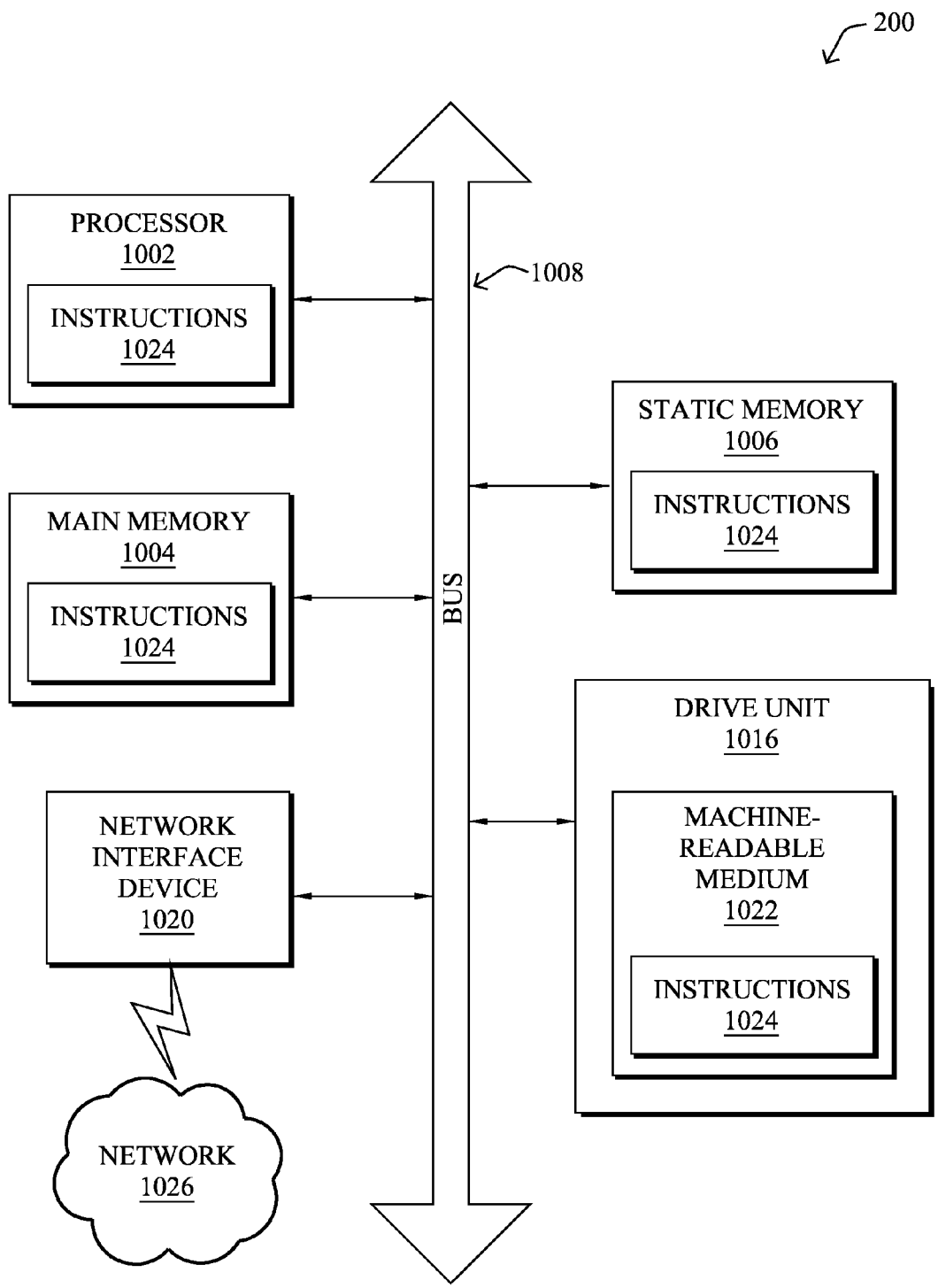
FIG. 3 is a simplified block diagram of a machine in the example form of an apparatus within which a set of instructions, for causing the machine to perform any one or more of the methodologies discussed herein, may be executed.

With regards to the aforementioned "attachment circuits", and with reference now to FIG. 3, shown is a simplified block diagram of a machine in the example form of an apparatus 200 within which a set of instructions, for causing the machine (e.g., an "attachment circuit") to perform any one or more of the methodologies discussed herein, may be executed and utilized within the components illustrated in the embodiment of FIG. 2. In alternative embodiments, the machine may be connected (e.g., networked) to other machines. The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example apparatus 200 includes a processor 1002 (e.g., a central processing unit (CPU)), a main memory 1004, and a static memory 1006, which communicate with each other via bus 1008. The apparatus 200 may also include a secondary memory component 1016 (e.g., a disk drive unit, flash, etc) and a network interface device 1020.

The secondary memory component 1016 includes machine-readable medium 1022 on which is stored one or more sets of instructions and data structures 1024 (e.g., software) embodying or utilized by any one or more of the methodologies or functions described herein. The instructions may also reside, completely or at least partially, within the main memory 1004 and/or within the processor 1002 during execution thereof by the apparatus 200, with the main memory 1004 and the processor 1002 also constituting machine-readable, tangible media. The instructions 1024 may further be transmitted or received over computer network 1026 via network interface device 1020 utilizing any one of a number of well-known transfer protocols.

While machine-readable medium 1022 is shown in an embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, etc.

With returning reference now to the illustrated embodiment of FIG. 2, PE devices 104 and 106 are shown coupled to an MPLS core network and are configured to provide Virtual Private Wire Service (VMS) connectivity to the DHD device 102. It is appreciated that DHD device 102 is preferably provided with Layer 2 connectivity to the core network. It is further to be appreciated that the illustrated embodiment of FIG. 2 is not to be understood to be limited to VPWS connectivity. In the embodiment of FIG. 2, PE devices 104 and 106 preferably form a G.8032 open Ethernet ring with a ring automatic protection switching (R-APS) virtual channel (VCL) 108 coupling PE devices 104 and 106. Ports 120 and 122 of respective PE devices 104 and 106 thus form the ring ports of the G.8032 open Ethernet ring wherein ports 124 and 126 of PE devices 104 and 106 complete the R-APS VLAN via VCL 108. It is to be appreciated that while the embodiment of FIG. 2 uses ports 124 and 126 to complete the R-APS VLAN, an Ethernet over MPLS pseudowire may alternatively be used (e.g., for geo-redundant PE devices).

DHD device 102 is provided with ports 128 and 130 which are each preferably configured to have the same VLAN/Bridge domains used for forwarding customer data to PE devices 104 and 106. It is noted that in the embodiment of FIG. 2, G.8032 is not configured on the DH device 102 but a VLAN/Bridge domain is dedicated to ports 128 and 130 on DI-ID device 102 configured for relaying G.8032 R-APS frames between PE devices 104 and 106. In the embodiment of FIG. 2. G.8032 is preferably implemented within control logic on each PE device 104 and 106 (via attachment circuits). Thus, by employing multiple Ethernet Ring Protection (ERP) instances in the aforesaid G.8032 Ethernet ring, data traffic is load-balanced on a per VLAN basis between PE devices 104 and 106. For instance, and with reference to the embodiment of FIG. 2, when network 100 is in a G.8032 idle state, port 120 of PE device 104 is operational to forward data traffic on the VLAN's for which it is not an RPL owner wherein control logic configured on the PE devices controls the PW state of each PE node based on the G.8032 state machine. For example, if port 120 of PE device 104 is unblocked by G.8032, then the corresponding PW state is determined to be active by the control logic and the PE device 104 advertises as being in an "Active" state in the Label Distribution Protocol (LDP) preferential forwarding status bit of the corresponding PWs. Thus, the control logic on PE device 106 sets the corresponding PW to "Standby" with the RPL link to port 122 being in a blocked condition.

In the embodiment of FIG. 2, it is to be understood PE device access link failures are protected by G.8032 protocol. Connectivity Failure Management (CFM) Down MEPs can be configured in the control logic on the PE and the DHD devices (102, 104 and 106) for faster failure detection whereby with Connectivity Fault Management (CFM) Continuity Check Messages (CCMs) running at approximately 3.3 msec, it is possible to detect access link failure condition in approximately 10 msec.

Figure 4:
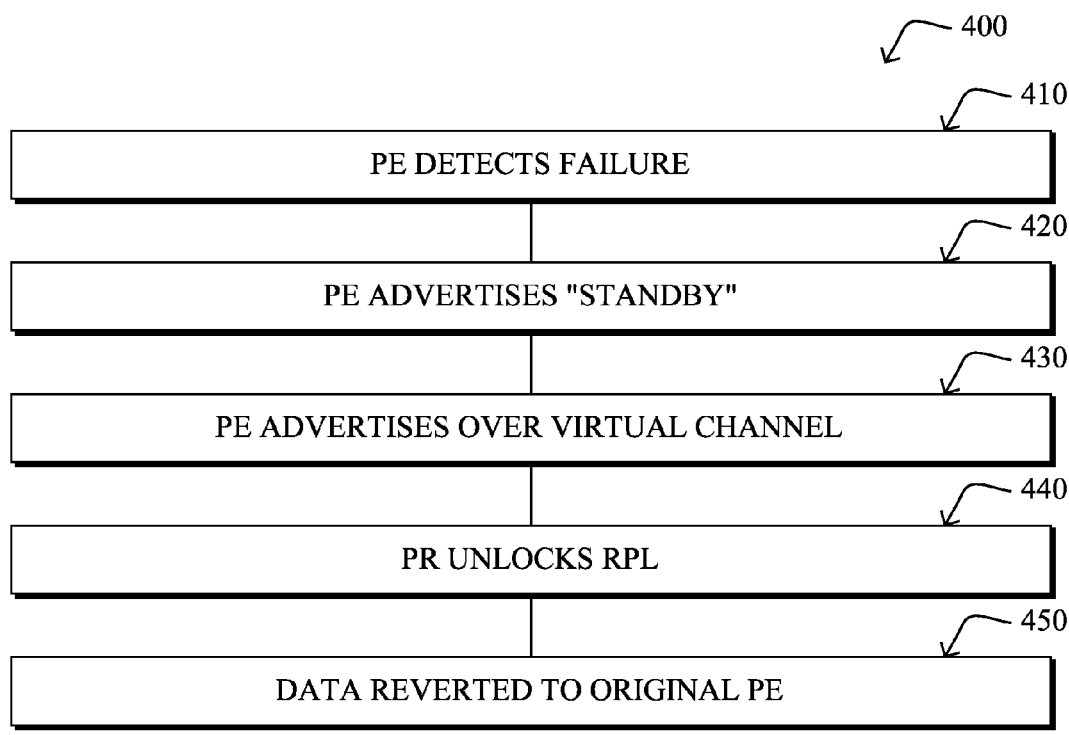
FIGS. 4-6 depict flow diagrams of processes for providing redundancy mechanisms for network connections in an Ethernet ring.

For instance, and with reference to FIG. 4 (with continuing reference to the illustrated embodiment of FIG. 2), upon detecting such access link failure, when the PE device (e.g., 106) detects a failure, it blocks its port (e.g., 122) connecting to the failed link (e.g., 151) (step 410), and the failed PE device (e.g., 106) advertises its PW state as "Standby" in the LDP (step 420). It is to be understood and appreciated, that in the event of the aforesaid failure, the PW is set in Down state and Standby state is used when the attachment circuit (as per G8032 state machine) is blocked but has no active failure. It is to be understood "Active" is AC is UP and forwarding; "StandBy" means no failure, AC is blocked by state machine as backup path; "Down" means failure exists on AC or Backbone; and "Admin-Down" means AC is administratively shut down.

The failed PE (e.g., 106) also advertises R-APS Signal Fail (SF) to the other PE device (104) over the virtual channel 108 (step 430). Next, upon receiving the aforesaid R-APS SF, the other PE device (e.g., 104) unblocks its RPL link (150) and activates its PWs (182) (step 440). After recovery, data traffic can be reverted back to the original PE device (e.g., 106) by preferably G.8032 administrative Command Line Interface (CLI) or automatically after a G.8032 Wait To Restore (WTR) timer is expired (step 450). It is noted that the unidirectional link failure can be detected by CFM.

Figure 5:
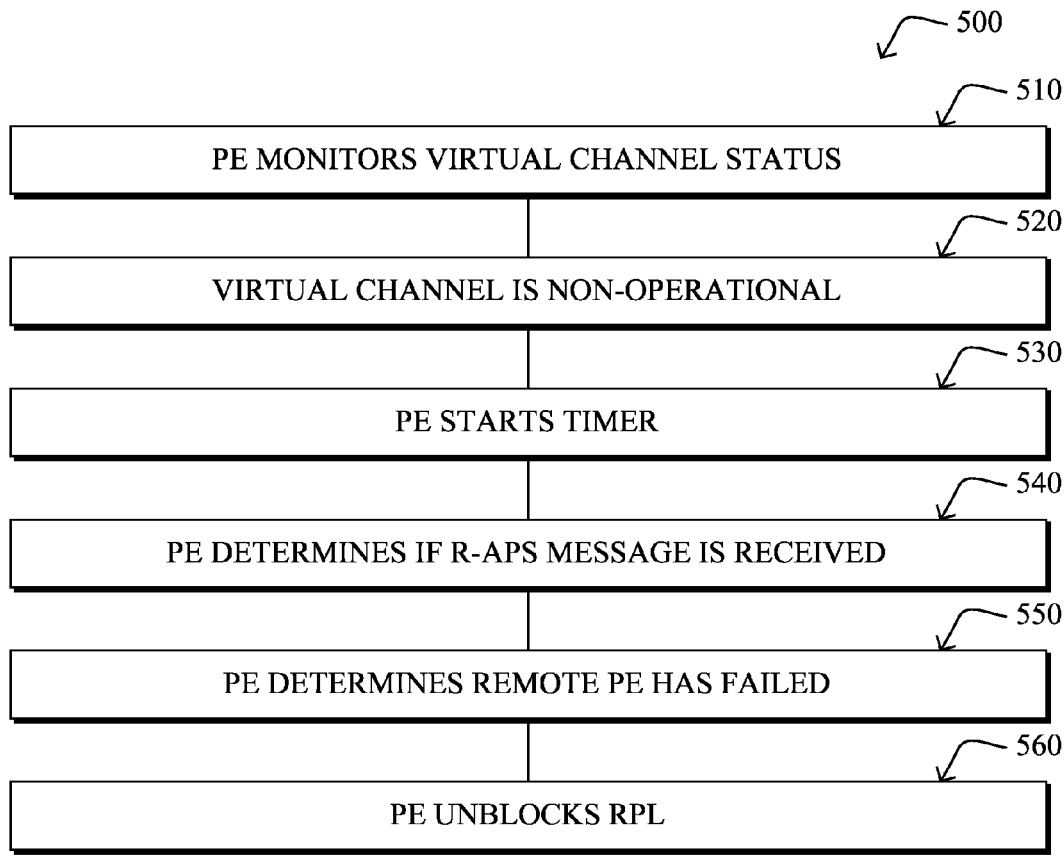

For instance, with regards to handling node failures, and with reference now to FIG. 5 (with continuing reference to the illustrated embodiment of FIG. 2), each PE device (e.g., 104 and 106) monitors the status of the virtual channel 108 (step 510). As mentioned above, this again can be achieved using CFM CCMs. Once the virtual channel 108 is non-operational (step 520), each PE device (e.g., 104, 106) preferably starts a timer (configurable in msec) (step 530) to detect if a R-APS message is received from a remote PE device over the access link before the timer expires (step 540). If no R-APS message is received, then the PE device (e.g., 104) deduces that the remote PE device (e.g., 106) has failed (step 550). As a result, the RPL is unblocked at its port (e.g., 120) and the updated PW status is advertised in LDP (step 560). Note that in the case where the virtual channel is implemented over a PW, the virtual channel may then be non-operational as a result of core-isolation on the remote PE. However in this scenario, the latter will preferably trigger G.8032 protection switching and the local PE would receive R-APS from access link instantly. This way, the local PE can distinguish core isolation from remote PE node failure.

Figure 6:
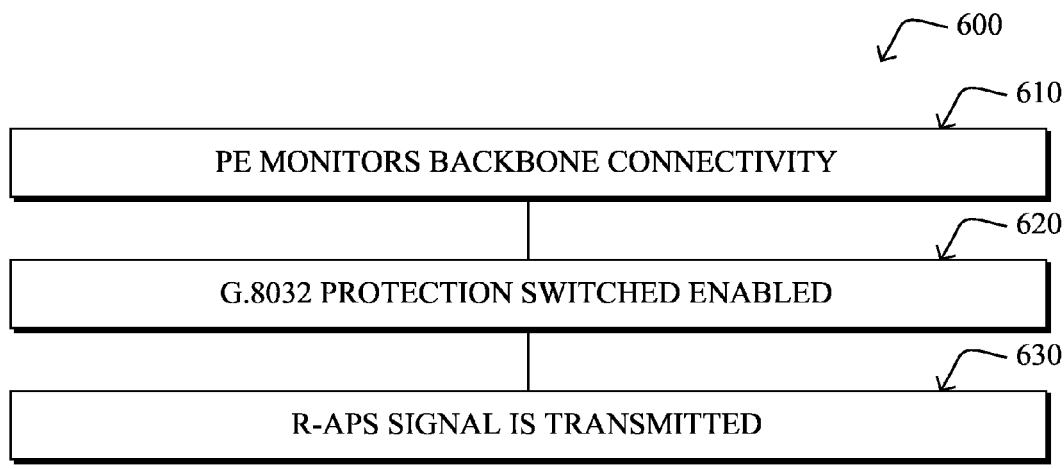

With regards to handling core isolation failures, and with reference now to FIG. 6 (with continuing reference to the illustrated embodiment of FIG. 2), backbone connectivity is monitored by each PE device (e.g., 104 and 106) using its control logic (step 610). Core isolation on a PE device (104, 106) preferably triggers G.8032 protection switching on its access port (120, 122) even though the core facing ports are not part of the G.8032 ring (step 620). The PE device (e.g., 106) then implements new logic which triggers the transmission of R-APS Signal Fail messages over its access link (e.g., 151), whenever the PE device (106) is isolated from the core network 100 (step 630). It is noted that in the event of PE device isolation, and upon reversion from failure, it is preferable to signal a MAC address table flushing notification to the DHD (102), which preferably can be achieved by sending MVRP (Multiple VLAN Registration Protocol) messages to the DHD (102). Alternatively, in the event the DHD (102) does not support MVRP functionality, the access link (151) can be made non-operational so to cause MAC address table flushing on the DHD (102), which can be used to provide 1:1 redundancy.

Therefore, with the above illustrative descriptions described above, it is to be understood and appreciated the embodiment of FIG. 2 provides a link redundancy protocol which provides a communication channel enabling redundant Ethernet access circuits to be terminated across multiple devices and thus, extending reliability beyond just link level protection but also to device level protection. As illustrated in FIG. 2, this link redundancy protocol allows one of the communication links 150 or 151 to serve as a backup link by managing the links 150 and 151 in "active" and "standby" states (or modes) such that only one of the links 150 or 151 is active at a time. For example, the communication link 151 actively passes network traffic while the communication link 150 is in a standby state. If the communication link 151 fails, then the communication link 150 takes over the network traffic, thereby maintaining network connectivity. As can be observed from the foregoing, embodiments described herein provide numerous advantages. For example, by using (running) the G.8032 protocol only on the PE devices (104, 106), a mechanism for L2VPN resiliency is provided that offers device dual-homing with the desired 50 msec protection time.

Although the method and system have been described in accordance with the embodiments shown, one of ordinary skill in the art will readily recognize that there could be variations made to the embodiments without departing from the scope of the present invention. For example, and as would be apparent to one skilled in the art, many of the process block operations can be re-ordered to be performed before, after or substantially concurrent with other operations. Accordingly, it is intended that all matter contained in the above description and shown in the accompanying drawings shall be interpreted as illustrative and not in a limiting sense.

The foregoing description has been directed to specific illustrated embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
   establishing, by a device, a virtual channel with a remote routing device in a G.8032 protocol Ethernet network ring, the device and the remote routing device each being linked to a multi-homed routing device having Layer 2 connectivity to a core network wherein the multi-homed routing device is not configured with the G.8032 protocol;
   monitoring, by the device, link states between the device and the multi-homed routing device;
   detecting, by the device, a failure in an access link between the device and the multi-homed routing device;
   blocking, by the device, a port associated with the failure in the access link;
   advertising, by the device, over the virtual channel between the device and the remote routing device, a fail signal to the remote routing device indicating that there has been a failure at the device, the fail signal triggering the remote routing device to remove a Ring Protection Link (RPL); and
   once the access link has recovered, unblocking, by the device, the port associated with the failure and reestablishing the RPL at the remote routing device.

2. The method as in claim 1 wherein the virtual channel is an inter-chassis control plane session.

3. The method as in claim 2 wherein the inter-chassis control plane session is a Ring Automatic Protection Switching (R-APS) virtual channel.

4. The method as in claim 3, further comprising:
   determining, by the device, that the virtual channel has failed;
   in response to determining that the virtual channel has failed, determining, by the device, if a R-APS message is received from the remote routing device before a timer on the device expires; and
   in response to not receiving the R-APS message before the timer expires, removing the RPL at the remote routing device.

5. The method of claim 1, wherein the remote routing device is configured as Ring Protection Link (RPL) blocking at least one link to the multi-homed routing device.

6. The method as in claim 1, further comprising:
   detecting, by the device, that the device is isolated from the core network;
   advertising a fail signal via an access link connected to the multi-homed routing device; and
   removing the RPL at the remote routing device.

7. An apparatus comprising:
   one or more network interfaces to communicate with a multi-homed routing device in a G.8032 protocol Ethernet network ring, wherein the multi-homed routing device is provided with Layer 2 connectivity to a core network and is not configured with G.8032 protocol;
   a processor coupled to the network interfaces and adapted to execute one or more processes according to control logic; and
   a memory configured to store a process executable by the processor, the control logic of the process when executed operable to:
      monitor link states between the apparatus and the multi-homed routing device;
      detect a failure in an access link between the apparatus and the multi-home routing device;
      block a port associated with the failure in the access link;
      advertise over the virtual channel between the apparatus and the remote routing device, a fail signal to the remote routing device indicating that there has been a failure at the apparatus, the fail signal triggering the remote routing device to remove a Ring Protection Link (RPL); and
      once the access link has recovered, unblock the port associated with the failure and reestablishing the RPL at the remote routing device.

8. The apparatus as in claim 7, wherein the apparatus links to a remote apparatus in the G.8032 protocol Ethernet network ring via a virtual channel.

9. The apparatus as in claim 8, wherein the virtual channel is an inter-chassis control plane session.

10. The apparatus as in claim 9, wherein the virtual channel is a Ring Automatic Protection Switching (R-APS) virtual channel.

11. The apparatus as in claim 8, wherein the apparatus is a routing device and the remote apparatus is a remote routing device and only one of the first and remote routing devices is configured with RPL at a time.

12. The apparatus as in claim 7, wherein the control logic when executed further operable to
   determine that the virtual channel has failed;
   in response to a determination that the virtual channel has failed, determine if a R-APS message is received from the remote apparatus before a timer on the apparatus expires; and
   in response to not receiving the R-APS message before the timer expires, removing the RPL at the remote apparatus.

13. The apparatus as in claim 7, wherein the control logic when executed further operable to:
   detect that the apparatus is isolated from the core network;
   advertise a fail signal via an access link connected to the multi-homed routing device; and
   remove the RPL at the remote apparatus.

14. A tangible, non-transitory computer-readable medium that stores instructions, which, when executed, are operable to cause a device to perform operations comprising:

establishing, at the device, a virtual channel with a remote routing device in a G.8032 protocol Ethernet network ring, the device and the remote routing device each being linked to a multi-homed routing device having Layer 2 connectivity to a core network wherein the multi-homed routing device is not configured with the G.8032 protocol;

monitoring link states between the device and the multi-homed routing device; and detecting a failure in an access link between the device and the multi-homed routing device;

blocking a port associated with the failure in the access link;

advertising over the virtual channel between the device and the remote routing device, a fail signal to the remote routing device indicating that there has been a failure at the device, the fail signal triggering the remote routing device to remove a Ring Protection Link (RPL); and once the access link has recovered, unblocking the port associated with the failure and reestablishing the RPL at the remote routing device.

15. The tangible, non-transitory computer-readable medium of claim 14, wherein the instructions are further operable to configure the remote routing device with RPL to block at least one link to the multi-homed routing device.

16. The tangible, non-transitory computer-readable medium of claim 14, wherein the instructions further operable to cause the device to perform operations further comprising:

detecting, at the device, that the device is isolated from the core network;

advertising a fail signal via an access link connected to the multi-homed routing device; and removing the RPL at the remote routing device.

17. The tangible, non-transitory computer-readable medium as in claim 14, wherein a remote apparatus in is linked with a device executing the tangible, non-transitory computer-readable medium in the G.8032 protocol Ethernet network ring via a virtual channel.

18. The tangible, non-transitory computer-readable medium of claim 16, wherein the virtual channel is an inter-chassis control plane session.

19. The tangible, non-transitory computer-readable medium as in claim 18, wherein the inter-chassis control plane session is a Ring Automatic Protection Switching (R-APS) virtual channel.

20. The tangible, non-transitory computer-readable medium as in claim 19, wherein the instructions further operable to cause the device to perform operations further comprising:

determining, by the device, that the virtual channel has failed;

in response to determining that the virtual channel has failed, determining, by the device, if a R-APS message is received from the remote routing device before a timer on the device expires; and in response to not receiving the R-APS message before the timer expires, removing the RPL at the remote routing device.

* * * * *

UNITED STATES PATENT AND TRADEMARK OFFICE
CERTIFICATE OF CORRECTION

Page 1 of 1

PATENT NO. : 9,800,432 B2
APPLICATION NO. : 14/740417
DATED : October 24, 2017
INVENTOR(S) : Pravin Gohite et al.

It is certified that error appears in the above-identified patent and that said Letters Patent is hereby corrected as shown below:

In the Specification

In Column 2, Line 43, please amend as shown:
An advantage of ITU-T recommendation G.8032 is that it In Column 3, Line 4, please amend as shown:
vices; 4) supports active/standby (1:1) as well as active/

In Column 3, Line 12, please amend as shown:
recommendation to provide sub-50 ms protection and recov- In Column 4, Line 55, please amend as shown:
Virtual Private Wire Service (VPWS) connectivity to the In Column 5, Line 9, please amend as shown:
ment of FIG.2, G.8032 is not configured on the DHD device In Column 5, Line 11, please amend as shown:
and 130 on DHD device 102 configured for relaying G.8032

In the Claims

In Column 8, Line 25, please amend as shown:
and the multi-homed routing device;

Signed and Sealed this
Twenty-ninth Day of December, 2020

Andrei Iancu
*Director of the United States Patent and Trademark Office*